United States Patent Office 3,299,528
Patented Jan. 24, 1967

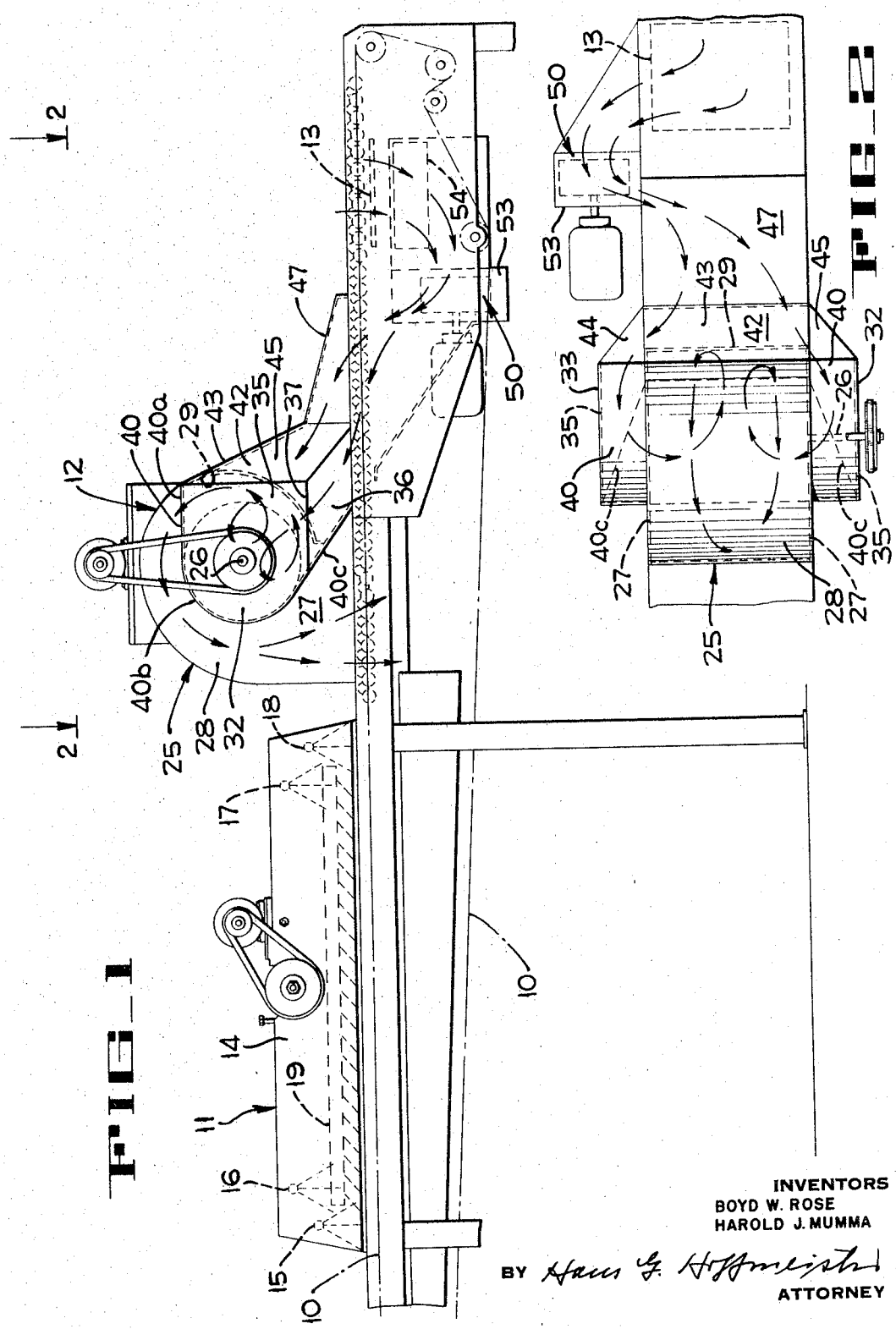

3,299,528
ARTICLE DRYING APPARATUS
Boyd W. Rose and Harold J. Mumma, Riverside, Calif., assignors to FMC Corporation, San Jose, Calif., a corporation of Delaware
Original application Sept. 28, 1962, Ser. No. 226,994. Divided and this application Oct. 13, 1965, Ser. No. 495,541
3 Claims. (Cl. 34—60)

This application is a division of application Ser. No. 226,994 which was filed on September 28, 1962.

This invention relates to article processing equipment, and more particularly concerns apparatus for drying articles, such as eggs, as they are advanced on a conveyor.

An object of the present invention is to provide an improved drying apparatus.

Another object is to provide a drying apparatus having improved hot air circulating means.

Another object is to provide a drying apparatus having a new and efficient means for circulating air relative to the article-supporting surface of a conveyor.

Other and further objects and advantages of the present invention will be apparent from the following description taken in connection with the accompanying drawings, in which:

FIGURE 1 is a diagrammatic side elevation of the drying apparatus of the present invention shown adjacent an article washer.

FIGURE 2 is a diagrammatic plan looking down on the mechanism of FIG. 1 as indicated by arrows 2—2 of FIG. 1.

In the machine disclosed in the above-identified parent application, which is incorporated by reference herein, eggs are automatically assembled on an endless roller processing conveyor 10 (FIG. 1) which is provided with a plurality of transverse rows of rotatable rollers, each roller having several sections of conventional hour-glass configuration which cooperate with adjacent leading and trailing roller sections to define pockets which support eggs with the long axis of each egg disposed transversely of the conveyor. The upper run of the conveyor 10, on which the eggs are supported, moves from left to right (FIG. 1) to carry the rotating eggs through a washer 11, a drier 12, and then over a candling light 13. The details of the washer do not form part of the present invention and, accordingly, the washer will not be described herein. In general, the washer includes a sheet metal housing 14 which contains spray devices 15, 16, 17 and 18, and a brush assembly 19 that moves in an orbital path such that the lower ends of the bristles move downwardly to engage and wipe across the eggs on the rollers of the conveyor 10 and then move upwardly away from the eggs.

The drier 12 comprises a blower 25 (FIG. 1) having a rotatable impeller (not shown) keyed to a shaft 26 that is journalled in suitable bearings in the opposite side walls 27 (FIG. 2) of a main blower housing 28 which has a usual volute configuration so that air entering axially into the impeller will be forced against the forward curved wall portion 29 (FIG. 1) and will be directed rearwardly and downwardly and be discharged downwardly across the upper run of the roller conveyor 10. Air is directed axially into the impeller through two ducts 32 and 33 which enclose opposite ends of the impeller. The ducts 32 and 33 are identical but oppositely disposed, and each duct is a box-like sheet metal member having a side wall 35, a bottom wall 36 that joins the side wall 35 at line 37 and slants downwardly and inwardly to a point near the lower edge of the adjacent side wall 27 of the main blower housing. The top wall 40 of each duct is formed by a sheet metal member having a horizontal portion 40a, a curved rear portion 40b and a generally triangular piece 40c that fits between the wall 36 of the main housing and the inwardly and forwardly slanted rear edge of the bottom wall 36. Both of the ducts 32 and 33 open into a chamber 42 formed by a slanted forward wall 43 and two identical side walls 44 and 45. Air is drawn into the chamber 42 from a hood 47 that has an open bottom which overlies the roller conveyor 10 and an open rear end that communicates with chamber 42.

Air is forced upwardly into the hood 47 by an auxiliary blower 50 which is mounted in a sheet metal housing 53 that has an inlet opening 54 (FIG. 1) communicating with a chamber formed by sheet metal housing members below the candling light 13. When the auxiliary blower is in operation, air is drawn downwardly over the candling light to cool the light and, at the same time, heat the air. It is then drawn laterally into the blower housing 53 as indicated by the flow arrows in FIGS. 1 and 2, and is forced by the impeller back inwardly under the roller conveyor 10 and upwardly into the hood 47. The air then moves into chamber 42 and then separates so that separate portions of air enter the impeller of the main blower from both sides and is forced upwardly, rearwardly and then downwardly over the wet eggs that have just been carried out of the washer on the roller conveyor 10. It will be particularly noted in FIG. 1 that the air makes three passes over the eggs on the roller conveyor and that, during the second and third passes, the air is warm and therefore capable of exerting an increased drying effect on the eggs.

While the complete structural details of the drier are not shown in the diagrammatic showing of FIGS. 1 and 2, it will be evident that the blower housings and air conduits are made of sheet metal members in the usual manner and are so arranged as to provide the necessary closed conduit system for guiding air along the path described above. The blowers are well known commercial units driven by suitable motors.

Having thus described our invention, what we claim as new and desire to protect by Letters Patent is:

1. In an egg processing machine, a conveyor having a conveying surface arranged to transport eggs along a fixed path, said surface comprising egg support members with opening between the members, a candling light disposed beneath said conveying surface at a candling station, means for moving air downwardly through said conveying surface and over said candling light to cool said light and heat said air, means for moving the heated air upwardly through said conveying surface at a first point upstream from said candling station to dry eggs thereon and means for moving the heated air downwardly through said conveying surface at a second point upstream from said candling station to carry out a second drying operation on the eggs.

2. A machine for drying wet eggs, an egg conveyor of the type having longitudinally spaced transverse rotating rollers formed to provide egg receiving pockets effective to cause rotation of an egg as it is being transported by said conveyor, housings on the top and bottom of said conveyor forming a serpentine passageway crossing the path defined by said conveyor at longitudinally spaced areas, and means for moving heated air through said housings to subject the surface of the egg to the heated air and thus effect drying thereof.

3. The invention according to claim 2 wherein the first of such longitudinally spaced areas of the serpentine path is downstream of the other areas.

References Cited by the Examiner

UNITED STATES PATENTS

| | | | |
|---|---|---|---|
| 507,304 | 10/1893 | Barney | 34—216 |
| 1,420,296 | 6/1922 | Thelen | 34—216 |
| 1,572,326 | 2/1926 | Straight | 34—28 |
| 1,685,026 | 9/1928 | Hults | 34—217 |
| 1,707,929 | 4/1929 | Bennett | 34—31 |
| 2,326,115 | 8/1943 | Arthur | 34—31 |
| 2,558,338 | 6/1951 | Clements | 34—216 |
| 2,799,096 | 7/1957 | Scott | 34—216 |
| 2,904,893 | 9/1959 | Willey | 34—31 |

WILLIAM J. WYE, *Primary Examiner.*